(12) United States Patent
Lucidarme (10) Patent No.: US 8,543,815 B2
(45) Date of Patent: Sep. 24, 2013

(54) AUTHENTICATION METHOD AND RELATED DEVICES

(75) Inventor: Thierry Lucidarme, Montigny le Bretonneux (FR)

(73) Assignee: Apple Inc., Cupertino, CA (US)

( * ) Notice: Subject to any disclaimer, the term of this patent is extended or adjusted under 35 U.S.C. 154(b) by 1441 days.

(21) Appl. No.: 11/529,023

(22) Filed: Sep. 28, 2006

(65) Prior Publication Data
US 2007/0074023 A1    Mar. 29, 2007

(30) Foreign Application Priority Data
Sep. 28, 2005    (EP) .................................. 05292016

(51) Int. Cl.
*H04L 29/06*    (2006.01)
(52) U.S. Cl.
USPC ............ 713/168; 713/167; 713/169; 340/5.2; 380/258
(58) Field of Classification Search
USPC ................................................ 713/169, 150
See application file for complete search history.

(56) References Cited

U.S. PATENT DOCUMENTS

| | | | |
|---|---|---|---|
| 4,759,063 A | | 7/1988 | Chaum |
| 7,987,364 B2 * | | 7/2011 | Kaechi ........................... 713/169 |
| 2006/0218393 A1 * | | 9/2006 | Hernandez et al. ............ 713/167 |

FOREIGN PATENT DOCUMENTS

WO    WO 2005/043282    5/2005

OTHER PUBLICATIONS

"Analysis of 802.16e Multicast/Broadcast group privacy rekeying protocol"; Ju-Yi Kuo; 2006—Stanford University; seclab.stanford.edu.*
JY Kuo "Analysis of 802.16e multicast/broadcast group privacy rekeying protocol"—CS 259 Final Project Report, 2006—seclab.stanford.edu, 6 pages.*
European Search Report, pp. 1-3, Feb. 1, 2006.
G. Karjoth, et al., "Privacy-Enabled Services for Enterprises" (Feb. 9, 2002), Proceedings of the 13$^{th}$ International Workshop on Database and Expert Systems Applications (DEXA '02), Piscataway, NJ, pp. 405-409, XP010612054, ISBN: 0-7695-16688, paragraph 02.3 (2002).
S. Schechter, et al., "Anonymous Authentification of Membership in Dynamic Groups" (Feb. 22, 1999), Financial Cryptography International Conference, FC'99, LNCS 1548, pp. 184-195, CP001006339, paragraph 0005, Springer-Verlag Berlin Heidelberg (1999).

(Continued)

*Primary Examiner* — Taghi Arani
*Assistant Examiner* — Jason Lee
(74) *Attorney, Agent, or Firm* — Meyertons, Hood, Kivlin, Kowert & Goetzel, P.C.; Stephen J. Curran (57) ABSTRACT

A method for authenticating a first party with a second party, the first and second parties having means for communicating with each other, the first party having secret information and supporting a plurality of authentication modes for authenticating the first party with another party, using said secret information, the authentication modes of said plurality being arranged for protecting the first party's privacy with respective degrees. A degree with which the first party's privacy must be protected when authenticating the first party with the second party is negotiated between the first party and the second party. If the negotiation is successful, the first party is authenticated with the second party according to the authentication mode of said plurality having the negotiated degree of protection of the first party's privacy.

19 Claims, 6 Drawing Sheets

(56) References Cited

OTHER PUBLICATIONS

Vanja Seničar, et al., "Privacy-Enhancing Technologies—Approaches and Development", Computer Standards and Interfaces, vol. 25, No. 2, Feb. 5, 2003, pp. 147-158, XP004418383, paragraphs 4.2.3 and 4.2.4, Elsevier Sequoia, Elsevier Science BV, Lausanne, Switzerland (2003).

Dan Boneh, et al., "Anonymous Authentication with Subset Queries", 6$^{th}$ ACM Conference on Computer and Communications Security, New York, NY, ACM US Feb. 11, 1999, pp. 113-119, XP001054528, paragraph 0002, (1999).

B. Kaliski, "The MD2 Message-Digest Algorithm", RFC 1319-121, IETF (Internet Engineering Task Force), pp. 1-15 (1992).

"Secure Hash Standard", FIPS (Federal Information Processing Standards Publication) 180-2, NIST, pp. 1-71 (2002).

R. L. Rivest, et al., "A Method for Obtaining Digital Signatures and Public-Key Cryptosystems", Comm ACM 21, pp. 120-126 (1978).

A. Fiat, et al., "How to Prove Yourself: Practical Solutions to Identification and Signature Problems", CRYPTO 86, pp. 186-194, Springer-Verlag (1987).

\* cited by examiner

AUTHENTICATION METHOD AND RELATED DEVICES

BACKGROUND OF THE INVENTION

The present invention relates to authentication.

Many mechanisms have been developed in order to authenticate a first party with a second party. These mechanisms are often based on key cryptography.

A "key" is a data sequence that can be used in an encryption/decryption (or ciphering/deciphering) algorithm to protect certain security sensitive information. A sender encrypts data with a key based encryption function, and sends it over an interface, to a recipient. The recipient decrypts the data received with a key based decryption function. So-called "symmetric cryptography" involves algorithms in which the key used for encryption is identical to the key used for decryption. By contrast, so-called "asymmetric cryptography" involves algorithms in which the key used for encryption is not necessarily identical to the key used for decryption, but rather interdependent through a mathematical relationship, both keys forming an "asymmetrical key pair".

Asymmetrical key pairs often comprise a "public" key used in conjunction with a "private" key. The "public" key, usually a long data sequence, is shared with a variety of systems, whereas the "private" key is not disseminated. For some key pairs, the public key is computed using the private key and a mathematical relation (such as the digital logarithm), which is such that it is virtually impossible to derive the private key from the public one.

Figure 1:
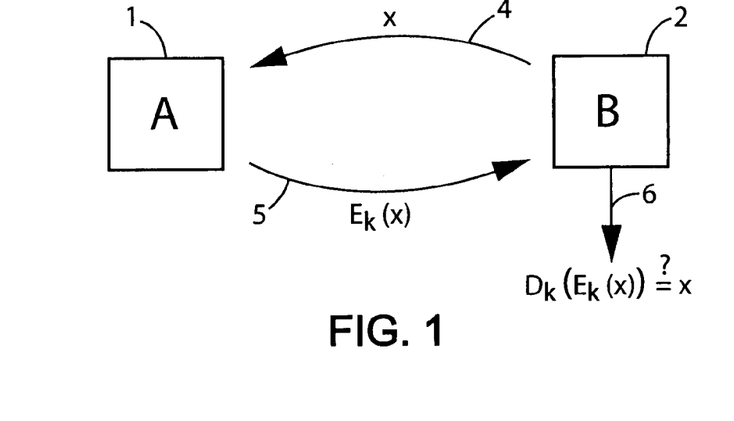
FIG. 1, already commented, shows an example of an authentication according to a private key based symmetric mechanism.

FIG. 1 shows an example where a first party A (1) is authenticated with a second party B (2) by virtue of symmetric cryptography. A has secret information in the form of a private key k, also known by B. This key k is kept private and is unknown to unauthorized parties. B first sends a random number x to A (transmission 4). A ciphers it with use of his private key k, in order to obtain a ciphered number $E_k(x)$ which is sent to B (transmission 5). Then, B deciphers the received number with use of the key k (reference 6). The deciphering is achieved with a k-based function $D_k$, reverse to the ciphering function. The result of this deciphering is compared to the initial number x by B. If $D_k(E_k(x))$ equals x, it means that A has ciphered the number x with the correct private key k. Since only A and B know this key, this authenticates A with B. If, by contrast, $D_k(E_k(x))$ is different from x, it may mean that A has ciphered the number x with an incorrect key, and thus A may be an usurper.

Figure 2:
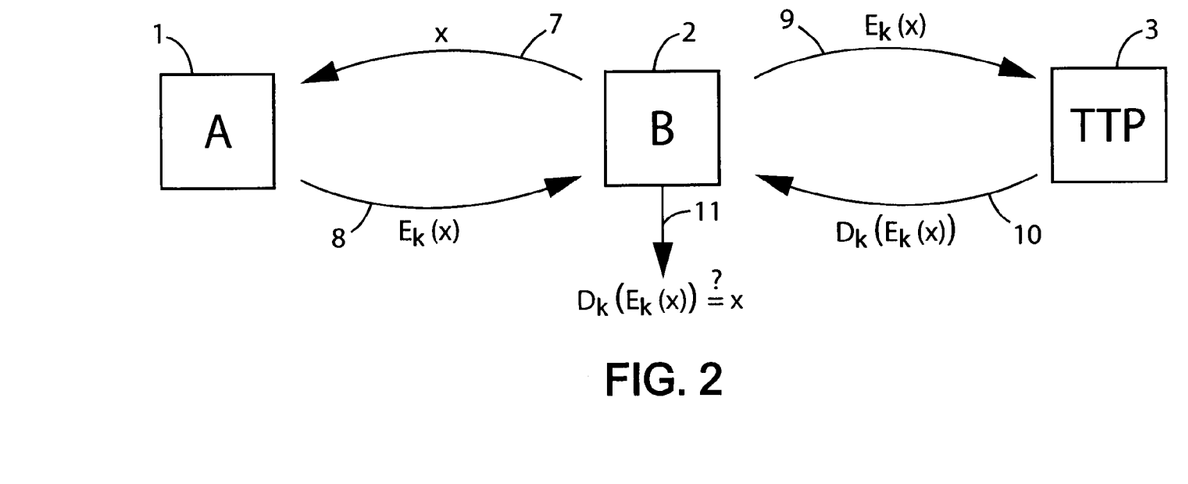
FIG. 2, already commented, shows an example of an authentication according to a private key based symmetric mechanism involving a trusted third party.

FIG. 2 shows another example of a symmetric authentication mechanism, in which the same operations as in FIG. 1 are distributed between A, B and a trusted third party TTP 3. In this example, B does not hold the private key k of A. Only the TTP 3 does. B first sends a random number x to A (transmission 7). A ciphers it with his private key k, in order to obtain a ciphered number $E_k(x)$ which is sent to B (transmission 8). B forwards the received number to the TTP 3 (transmission 9), which deciphers it with the function $D_k$ reverse to the ciphering function $E_k$, thanks to his knowledge of the private key k. The result of the deciphering is sent to B (transmission 10), where a comparison between $D_k(E_k(x))$ and x can be made (reference 11). Like in the case of FIG. 1, A is authenticated with B only when the comparison is positive.

The ANSI (American National Standards Institute) standard DES (Data Encryption Standard) as well as the NIST (National Institute of standards and Technology) standard AES (Advanced Encryption Standard) are well known encryption algorithms which can be used in such symmetric authentication mechanisms.

In other examples using asymmetric cryptography, the parties are provided with dual keys, such that the number ciphered by the first party with the first key can be deciphered by the second party with the second key dual to the first key.

Figure 3:
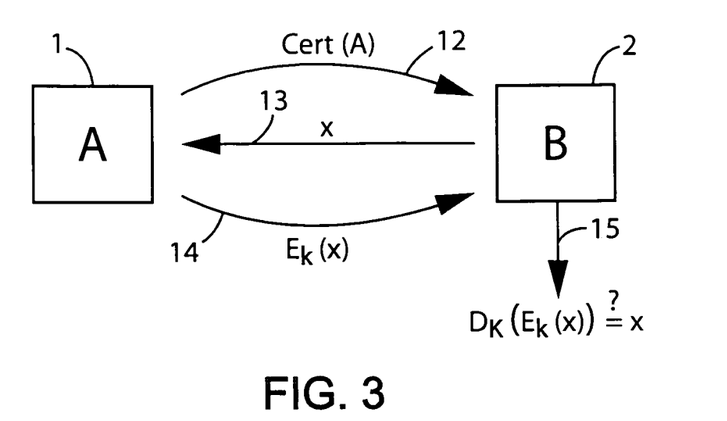
FIG. 3, already commented, shows an example of an authentication according to an asymmetric mechanism.

FIG. 3 shows an example of an authentication mechanism using asymmetric cryptography. In this example, a first party A (1) has secret information in the form of a private key k for ciphering data. This key k is kept private and is unknown to unauthorized parties. A also has a public key K that another party can use for deciphering data received from A. In order to ensure that B is provided with the correct public key K in view of an authentication of A, A sends B a certificate containing his key K (transmission 12).

Figure 4:
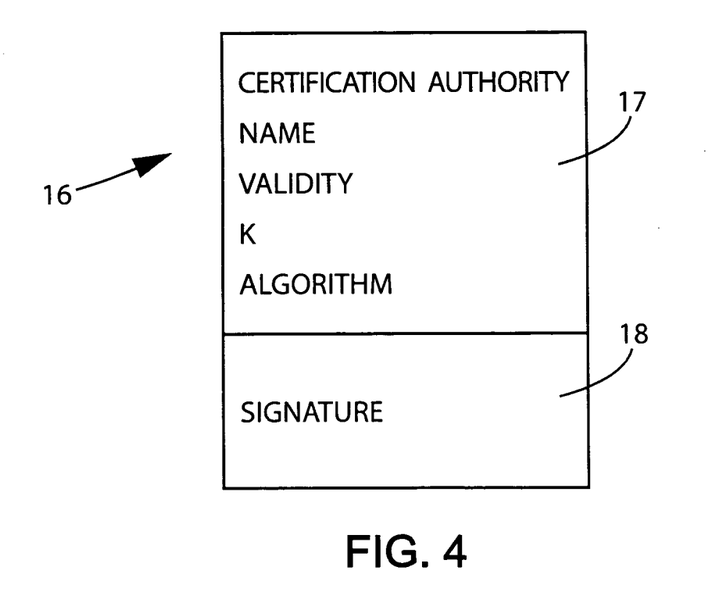
FIG. 4, already commented, shows a certificate used in the mechanism of FIG. 3.

A's certificate Cert(A) can advantageously be built by a certification authority and can have the form specified in the ITU-T (International Telecommunication Union) standard X.509 and schematically shown in FIG. 4 (reference 16). It is divided into two different parts. The information part 17 includes the public key K of A. It also includes information such as an identity of the certification authority, A's name, some validity information like the expiry date of the certificate, as well as an algorithm used by the certification authority to sign the certificate. The other part 18 contains the signature (thumbprint) of the certificate obtained with the algorithm indicated in the information part 17. The signature is generally obtained by applying a hash algorithm to the information part 17 of the certificate, whose result is ciphered with a private key of the certification authority. The hash algorithm can be SHA-1 (specified in the "*Secure Hash Signature Standard (SHS)*" by the NIST (see FIPS PUB 180-2)) or a message-digest algorithm such as MD2, MD4 or MD5 (further information the message-digest algorithms can be found in the Request For Comments 1319-121 published by the Internet Engineering Task Force (IETF))

On reception of Cert(A), B calculates a hash of the information part 17 of the certificate with the hash function corresponding to the algorithm indicated in the Cert(A). It also deciphers the signature part 18 of the certificate by using the public key of the certification authority, and thus obtains the corresponding hash. If both hash values are equal, Cert(A) is valid and the public key K of A is reliable.

B sends a random number x to A (transmission 13). A ciphers it with his private key k, in order to obtain a ciphered number $E_k(X)$ which is sent to B (transmission 14). Then, B deciphers the received number with the public key K of A (reference 15). The deciphering uses a K-based function $D_K$ reverse to the ciphering function $E_k$. The result of this deciphering is compared to the initial number x by B. If $D_K(E_k(x))$ equals x, it means that A has ciphered the number x with the correct private key k. Since, only A knows this key, this authenticates A with B. If, by contrast, $D_K(E_k(x))$ is different from x, it may mean that A has ciphered the number x with an incorrect key, and thus A may be an usurper.

For example, the widely used RSA cryptosystem, described by R. L. Rivest, A. Shamir and L. Adleman in the article "A method for obtaining digital signatures and public-key cryptosystems", Comm. ACM 21 (1978), p. 120-126, can be used in such asymmetric authentication.

Like in the case of FIG. 2, a trusted third, party TTP could be in charge of deciphering and potentially of the validity check of A's certificate. This allows B to have light data processing means.

In the mechanisms described above, information relating to A is revealed to B. Indeed, in the example of FIG. 1, a random number x known by B and ciphered with A's private key k is sent to B. Since B also knows A's private key, he is in a position to prove that A has been authenticated with him.

The same applies to the example of FIG. 3: a random number x known by B and ciphered with A's private key k is sent to B. Since B is capable of retrieving x from the received ciphered number with A's public key, he is in a position to prove that A has been authenticated with him.

Such authentication mode is said to be opposable in the following, since B can oppose his authentication to A, by proving to a third party that A has been authenticated with him.

In a number of applications, such opposability towards the authenticated party is undesirable, in order to protect his privacy. In other terms, the authenticating party must have a sufficient degree of certainty that the authenticated party is the one he claims to be; but he must not be in a position to keep information which could later prove that the authenticated party has been authenticated with him.

Known authentication mechanisms reach this goal, i.e. can operate in a non-opposable mode. This is especially the case for mechanisms of the zero knowledge type.

Figure 5:
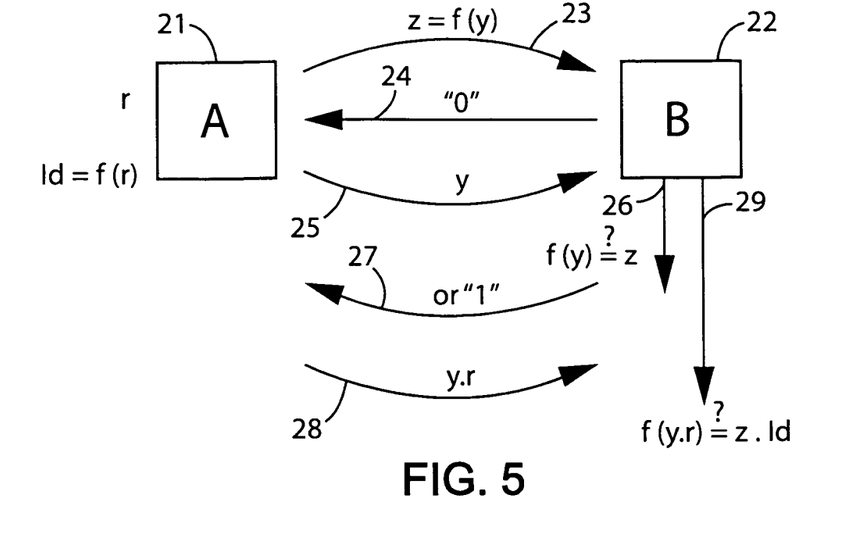
FIG. 5, already commented, shows an example of an authentication according to a zero knowledge mechanism.

FIG. 5 shows an example of such mechanism. A first party A (21) has secret information in the form of a secret number r. A also has a public identity Id which is a function of the secret number r, i.e. Id=f(r). For instance, f is a function such as $f(a.b)=f(a).f(b)$, for any numbers a and b. It must be chosen in such a way that its reverse function $f^{-1}$ is very difficult to calculate. For example, f could a square function modulo an integer n. The function f is known by the second party B (22) At the beginning of the authentication, A chooses a random number y, calculates $z=f(y)$ and sends it to the second party B (transmission 23). B can then send A either a "0" (transmission 24) for asking for $f^{-1}(z)$ or a "1" (transmission 27) for asking for $f^{-1}(z.Id)$, that is $f^{-1}(z).r$. A responds to the reception of a "0" with the value y (transmission 25). On reception, B calculates f(y) and can check that it is equal to the previously received value z (reference 26). Alternatively, A responds to the reception of a "1" with the value y.r (transmission 28). On reception, B calculates $f(y.r)=f(y).f(r)$ and checks whether it is equal to z.Id (reference 29). In case of equality, this means that A knows the secret number r and thus is the one he claims to be. Therefore, A is authenticated with B.

The reason why B randomly sends a "0" or a "1" to A is to avoid cheating from A. Indeed, if A was always supposed to send $f^{-1}(z.Id)$ to B, he could send z/Id instead of z in the initial transmission 23. Then, $f^{-1}(z.Id)$ would be replaced by $f^{-1}(z)=y$, which does not need any knowledge of the secret number r from A. Since A does not know in advance whether he will receive a "0" or a "1", he cannot cheat. If A always sends a correct response to the "0s" or "1s" sent by B for a number k of successive uses of the mechanism, it means that A indeed holds the secret number r. Therefore, A is authenticated with B.

It must noted that in the example of FIG. 5, B knows that A has been authenticated with him (when a "1" has been sent to A) because he verifies that f(y.r) is proportional to A's identity Id by the random number z previously received. But, he is not in a position to prove it. Indeed, it could be shown that, since B can choose in advance which sequence of "0s" and "1s" he will use, he could invent an imaginary successful dialog with another fictive party, and wrongly claim on the basis of this dialog that the fictive party has A's identity and thus that A has been authenticated with him.

In other words, the authentication mechanism of FIG. 3, whereas it is efficient, does not allow B to prove that A has been authenticated with him. Such authentication is thus not opposable to A. A's privacy is thus protected in this regard.

The Fiat-Shamir algorithm, described in the article "How to prove yourself: practical solutions to identification and signature problems", CRYPTO 86, Springer-Verlag 1987, p. 186-194, is an example of a zero knowledge authentication mechanism consistent with what has been described above.

However, even when a party wishes to be authenticated with a non-opposable authentication method, it is not certain that the authenticating party supports such mechanism or accepts this mode of operation. This difficulty may prevent the parties to carry out an access or a service (e.g. a communication service, a commercial transaction, an information exchange, etc.), since no authentication has been possible previously.

Moreover, even if the zero knowledge mechanism improves the level of A's privacy protection, by preventing B from proving that A has been authenticated with him, it could considered as insufficient in some cases. For instance, there are applications in which not only the authentication should not be opposable, but also the identity of the authenticated party should not be revealed.

But, in the authentication mode described above, B is always capable of determining that A has been authenticated with him. For instance, in the example of FIG. 1, B must know that A is the one trying to authenticate himself, to be in a position to decipher the received number $E_k(x)$. Indeed, such deciphering is based on the use by B of A's private key k. Similarly, in the example of FIG. 3, B must know that A is trying to authenticate himself to be in a position to decipher the received number $E_k(x)$ by using A's public key K. Even in the example of FIG. 5, B knows A's identity Id, since he uses it to check that f(y.r)=z.Id.

Therefore, A's privacy is not totally protected in this non-anonymous authentication mode, even when using a non-opposable authentication mechanism.

An object of the present invention is to limit the above-mentioned disadvantages.

Another object of the invention is to allow authentication taking into account the protection of privacy.

Another object of the invention is to allow authentication for different policies and capabilities of the parties involved in terms of protection of privacy.

SUMMARY OF THE INVENTION

The invention proposes a method for authenticating a first party with a second party, the first and second parties having means for communicating with each other, the first party having secret information and supporting a plurality of authentication modes for authenticating the first party with another party, using said secret information, the authentication modes of said plurality being arranged for protecting the first party's privacy with respective degrees. The method comprises the following steps:

negotiating, between the first party and the second party, a degree with which the first party's privacy must be protected when authenticating the first party with the second party; and if the negotiation is successful, authenticating the first party with the second party according to the authentication mode of said plurality having the negotiated degree of protection of the first party's privacy.

In this way, the authentication is adapted to the requirements and capabilities of the first and second parties, in terms of protection of privacy.

The authentication modes of said plurality arranged for protecting the first party's privacy with respective degrees can comprise at least a non-opposable authentication mode and an opposable authentication mode. This allows a control of the level of protection of the first party's privacy in terms of opposability, which means that the second party can or cannot prove that the first party's has been authenticated with him according to the negotiation result. The non-opposable authentication mode can implement an authentication mechanism of the zero knowledge type, while the opposable authentication mode can implement an authentication mechanism of the private key type in which the secret information of the first party is a private key shared by the first and second parties, or an authentication mechanism of the public key type.

The secret information held by the first party is to be understood as information secret and unknown to unauthorized parties.

In replacement or in addition, the authentication modes can comprise at least an anonymous authentication mode and a non-anonymous authentication mode. This allows a control of the level of protection of the first party's privacy in terms of anonymity, which means that the second party can or cannot know that the first party's is authenticated with him according to the negotiation result.

Advantageously, the anonymous authentication mode comprises a secured allocation of new secret information to the first party by an anonymity manager and is arranged for authenticating the first party with another party using said new secret information. The new secret information can be allocated for a limited time period. It can also be common to a group of parties to which the first party belongs. In addition, a pseudo identity can be allocated to the first party by the anonymity manager in correspondence with said new secret information.

Advantageously, the negotiation of the degree with which the first party's privacy must be protected when authenticating the first party with the second party takes account of an access or service to be carried out between the first party and the second party. Therefore, several negotiations could be made between the first and second parties according to successive accesses/services to be carried out.

An anonymous payment from the first party to the second party can further be made when the first party has been authenticated with the second party according to an anonymous authentication mode or when the negotiation of the degree with which the first party's privacy must be protected has failed.

The first party and/or the second party can be related to at least one among: a terminal, a sensor, a server and an access point of a communication system. The means for communicating between the first party and second party can be wireless, e.g. radio.

The invention also proposes a device related to a first party having secret information, the device supporting a plurality of authentication modes for authenticating the first party with another party, using said secret information, the authentication modes of said plurality being arranged for protecting the first party's privacy with respective degrees. The device comprises communication means for exchanging information between the first party and a second party arranged so as to:

negotiate a degree with which the first party's privacy must be protected when authenticating the first party with the second party; and if the negotiation is successful, authenticate the first party with the second party according to the authentication mode of said plurality having the negotiated degree of protection of the first party's privacy.

The invention also proposes an authentication device supporting at least one authentication mode arranged for authenticating a party having secret information by using said secret information. The authentication device has means for communicating with the party and comprises:

means for negotiating, in cooperation with the party, a degree with which the party's privacy must be protected during an authentication, so that the degree of protection of the first party's privacy corresponds to the one of an authentication mode supported by the authentication device; and means for, if the negotiation is successful, authenticating the party according to the authentication mode having the negotiated degree of protection of the first party's privacy.

The invention also proposes a system for authenticating a first party with a second party, the system comprising means for implementing the above-mentioned method.

The invention also proposes a computer program product comprising instructions for at least partly implementing the above-mentioned method, when loaded and executed on computer means related to the first party and/or the second party.

The preferred features of the above aspects which are indicated by the dependent claims may be combined as appropriate, and may be combined with any of the above aspects of the invention, as would be apparent to a person skilled in the art.

DESCRIPTION OF PREFERRED EMBODIMENTS

Figure 6:
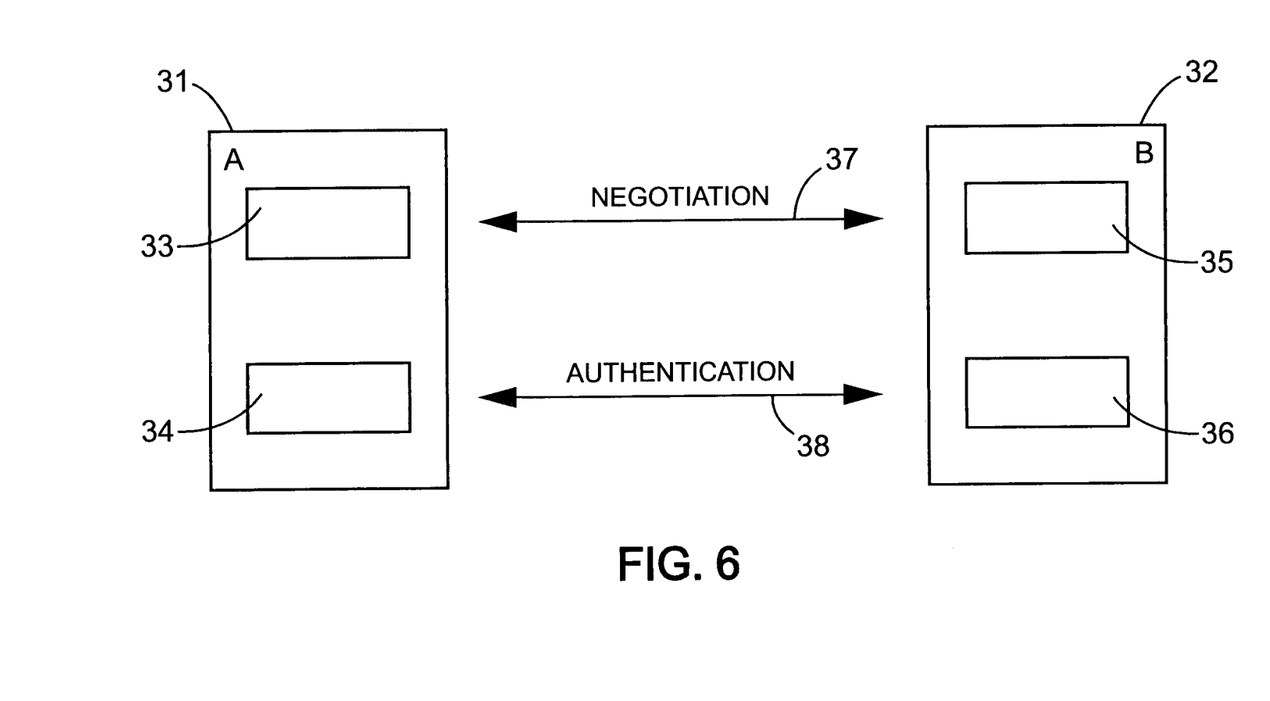
FIG. 6 shows an example of an authentication between two parties according to the invention.

In the example illustrated in FIG. 6, a first party A (31) aims at being authenticated with a second party B (32). A and/or B can be related to any type of device, such as a terminal, a sensor, a server or an access point of a communication system. A and B must be capable of communicating with each other, directly or through a telecommunication network for instance. The communication means between A and B can advantageously be wireless. Advantageously, A and/or B can be part of an Ambient network.

In the following, only the authentication of A with B will be considered. But an authentication of B with A could of course be carried out as well, according to the principles described below.

The authentication of A with B is needed, for instance, in view of carrying out an access or a service (e.g. a communication service, a commercial transaction, an information exchange, etc.).

According to the circumstances, A can wish to protect his privacy with varying degrees. For example, he could wish to let no trace which could be opposed to him in order to prove that he has been authenticated with B. He could also wish to be authenticated in a totally anonymous way.

According to a first aspect of the invention relating to the opposability notion as a criterion of protection of privacy, A supports two different authentication modes with respective degrees of protection of privacy, which can each be carried out with one or several authentication mechanisms. The first authentication mode 33 is said non-opposable, which means that when A authenticates himself with this mode, the authenticating party cannot later prove that A has been authenticated with him. By contrast, the second authentication mode 34 is said opposable, which means that when A authenticates himself with this mode, the authenticating party can later prove that A has been authenticated with him.

The non-opposable authentication mode 33 can be carried out by virtue of an authentication mechanism of the zero knowledge type for instance, as described in the introduction of the present application. The opposable authentication mode 34 can be carried out by virtue of a private key based symmetric mechanism or a public key based asymmetric mechanism for instance, as described in the introduction of the present application. This second authentication mode 34 is provided in particular for the case the other party B would not consider authenticating A without keeping a trace of it.

On the other hand, B supports one or several authentication modes in order to authenticate another party. In the example of FIG. 6, B supports two authentication modes 35 and 36.

The authentication modes 35 and 36 could be consistent with the authentication modes 33 and 34 implemented in A. This is the case especially when A and B are specifically designed to operate with one another. Alternatively, the authentication modes 35 and 36 could be independent of the authentication modes 33 and 34 implemented in A. This is the case especially when B is designed to authenticate any party, e.g. a server designed to authenticate any distant client.

In a first step, a negotiation 37 is started between A and B, in order to determine the degree with which A's privacy must be protected during his authentication with B. The negotiation takes into account the requirements and capabilities of each party. When A and/or B are related to a device, such device is arranged for exchanging information between A and B, so that the negotiation 37 can take place.

As an example of negotiation 37, A may notify B that he wishes to be authenticated according to a non-opposable authentication mode, whereas B may notify A that he requires an opposable authentication mode. The requirements of each party could also take account of the access or service to be carried out after the authentication. For instance, a Web server B could accept that a client A reads some Web pages after a non-opposable authentication, because the consultation of these pages is open to anybody, but could require an opposable authentication of A when the latter wishes to modify sensitive data in the server, like banking or medical data for example.

In another example, A may notify B that he wishes to be authenticated with B according to a non-opposable authentication mode, whereas B supports an opposable authentication mode only.

In still another example, B may notify A that he wishes A to be authenticated according to a non-opposable authentication mode. This can be appropriate especially when B does not want to or does not have the capabilities to durably memorize the authentications made with him and/or to later oppose them to their authors.

At the end of a successful negotiation 37, the degree with which A's privacy must be protected, in terms of opposability, is determined. This means that it is determined which one of an opposable authentication mode or a non-opposable authentication mode is to be used. In case A and B have the same requirements and capabilities, the determination of the authentication mode is relatively straightforward. By contrast, when A and B have different requirements or capabilities in terms of opposability, the negotiation could bring A or B to accept the mode opposable authentication mode proposed by the other party.

If the negotiation 37 is successful, an authentication 38 of A is then carried out with B according to the authentication mode having the negotiated degree of protection of A's privacy. Thus, if opposability is required, A will be authenticated with B according to the opposable authentication mode 34. If, by contrast, non-opposability is required, A will be authenticated with B according to the non-opposable authentication mode 33.

In the other cases where the negotiation 37 has not succeeded, because no agreement could be reached between A and B or because the authentication modes implemented by A and B are incompatible, the authentication 38 cannot be achieved.

Figure 7:
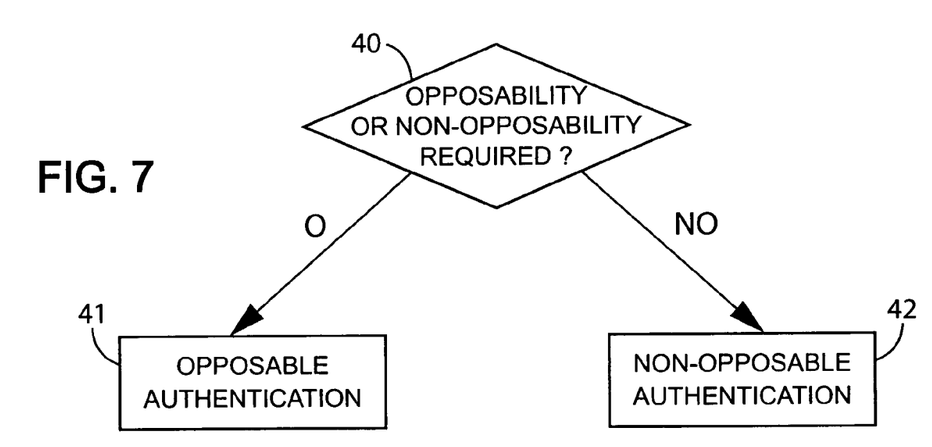
FIG. 7 is a flow chart showing steps of an authentication method according to a first aspect of the invention

FIG. 7 shows the same in a flow diagram. It is first determined which one of opposability or non-opposability is required for authentication (step 40). If opposability is required, opposable authentication is carried out (step 41), whereas if non-opposability is required, non-opposable authentication is carried out (step 42).

It must be noted that the authentication mechanism used for authenticating A with B can also be subject to a negotiation between A and B. For example, if an opposable authentication must be carried out between A and B, it could decided either a private key based symmetric mechanism or a public key based asymmetric mechanism is preferred. This negotiation can be part of the negotiation 37 or separate. It can take into account many different criteria like a support by each party, the implied power consumption, the memory and the processing capacities of each party, etc.

According to a second aspect of the invention relating to anonymity as a criterion of protection of privacy, A supports two different authentication modes with respective degrees of protection of privacy, which can each be carried out with one or several authentication mechanisms. Still with reference to FIG. 6, the first authentication mode 33 is now said anonymous, which means that the authenticating party does not know that A is authenticated with him. By contrast, the second authentication mode 34 is now said non-anonymous, which means that the authenticating party knows that A is authenticated with him.

The non-anonymous authentication mode 34 supported by A can use various authentication mechanisms with which the authenticating party is capable of identifying A. In particular, any one of the authentication mechanisms described in the introduction of the present application can be used in this regard.

Figure 8:
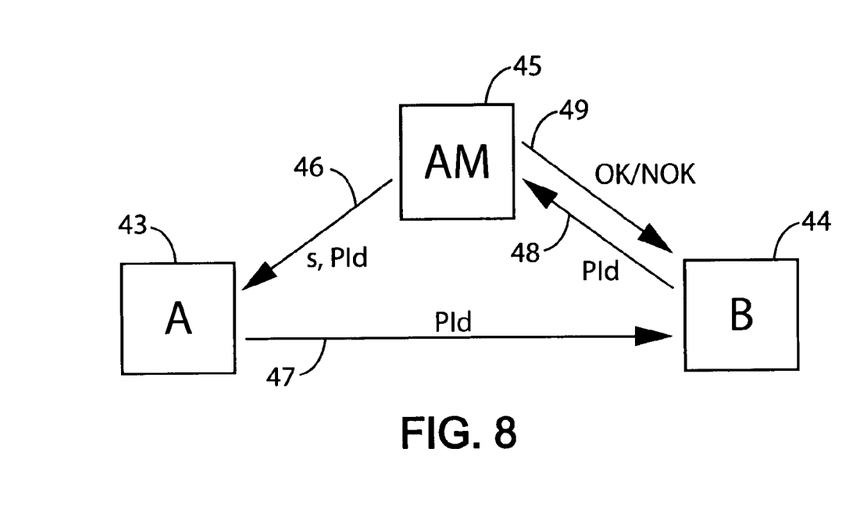
FIG. 8 shows an anonymity management according to a second aspect of the invention.

As shown in FIG. 8, the anonymous authentication mode 33 supported by A can comprise the allocation to A (43) of new secret information, here a new secret information s, by an anonymity manager (AM) 45. This new secret information s is intended to replace the permanent secret information of A, in one or some future authentications. The AM 45 is a third party having a secured communication channel with A over which the new secret information s is sent to A (reference 46), possibly on A's request. The AM 45 can belong to a bank, an official organization, a firm, etc. A first authentication of A can be carried out with the AM 45, before the new secret information s is allocated to A.

Advantageously, the new secret information s can be allocated to A for a limited time period, so that it can be used for one or a limited number of authentications only, in to order to ensure protection of A's identity.

Then, the authentication of A with B can use various authentication mechanisms. In particular, any one of the authentication mechanisms described in the introduction of the present application, with reference to FIG. 1 to FIG. 5 can be used in this regard. But, these authentication mechanisms use A's new secret information s, instead of the A's permanent secret information. The selection of a particular authentication mechanism, which can be part of negotiation between A and B, can have various motivations, like a support by each party, the implied power consumption, the memory and the processing capacities of each party, etc.

As an example of such anonymous authentication, it is considered here that a symmetric authentication mechanism, as the one described in FIG. 1, is used for authenticating A with B. Thus, B first sends a random number x to A which ciphers it with a ciphering function $E_s(x)$ depending on the newly allocated secret information s. This differs from the case of FIG. 1 described in the introduction, in which the random number x was ciphered by A with a ciphering function $E_k(x)$ depending on the private key k of A. Here, B who does not know A's new secret information s, is not in a position to decipher $E_s(x)$ by himself. He can thus send the received value $E_s(x)$ to the AM 45 together with the random number x. Since he knows the new secret key s allocated to A, the AM 45 is able to decipher the value $E_s(x)$ by virtue of the appropriate deciphering function $D_s$ and to conclude that $D_s(E_s(x))=x$. The AM 45 can return a message to B to indicate that the authentication is successful in this case. Then, B can give an access or carry out a service with A.

In this example, it is clear that B has authenticated A without knowing who he was. Moreover, since the AM 45 is the only one to know that the new secret information s has been allocated to A, nobody else can know that A has been authenticated with B. Such authentication is thus fully anonymous, the AM 45 protecting A's identity.

Advantageously, the new secret information s allocated to A by the AM 45 could be common to a group of parties to which A belongs. In this case, even if B knows the new secret information s (e.g. because it is given to him by the AM 45), B will not be in a position to determine with certainty that A has been authenticated with him. Indeed, any party of said group to which A belongs can have been authenticated with B by using the new secret information s. This constitutes a further protection of A's identity.

In addition and as illustrated in FIG. 8, a pseudo identity PId can be allocated to A by the AM 45, in correspondence with the new secret information s. This pseudo identity is particularly useful when the authentication mechanism used to authenticate A with B needs identity information. In particular, this is the case when an authentication mechanism of the zero knowledge type, as described above with reference to FIG. 5, is carried out.

In this case, a pseudo identity $PId=f(s)$ can be sent to A by the AM 45 (reference 45). A can send his pseudo identity PId to B (reference 47), since B cannot retrieve A's real identity Id from PId by himself. The authentication of A with B can then comprise the transmission from A to B of a number $z=f(y)$, where y is a random number, like in the example described with reference to FIG. 5. If B sends a "1" to A, the latter will return the value y.s (instead of y.r in the example of FIG. 5). B then calculates f(y.s) and checks whether it equals z.PId. Alternatively, the calculation of f(y.s) and its comparison with z.PId could be under the responsibility of the AM 45.

With this example as well, it can be understood that B authenticates A without knowing who he is, since B only gets the pseudo identity PId allocated to A. B neither gets A's real identity Id, nor knows a correspondence between PId and Id, such correspondence being protected by the AM 45.

Before anonymously authenticating A, B may check that the pseudo identity PId used by A is valid. If not, any party may be able to authenticate himself with B by providing any pseudo identity. To avoid this, B sends the AM 45 the pseudo identity PId received from A (reference 48 in FIG. 8). The AM 45 checks whether it has previously allocated this pseudo identity PId and if it is still valid (e.g. its time period has not expired yet). The AM 45 responds to B by indicating whether PId is valid or not (reference 49). Optionally, in his transmission 48, B could also request other information about the pseudo identity PId received from A, like whether it is a group or an individual pseudo identity. In his response, the AM 45 can answer B's request, provided that it does not break the protection of A's identity.

Figure 9:
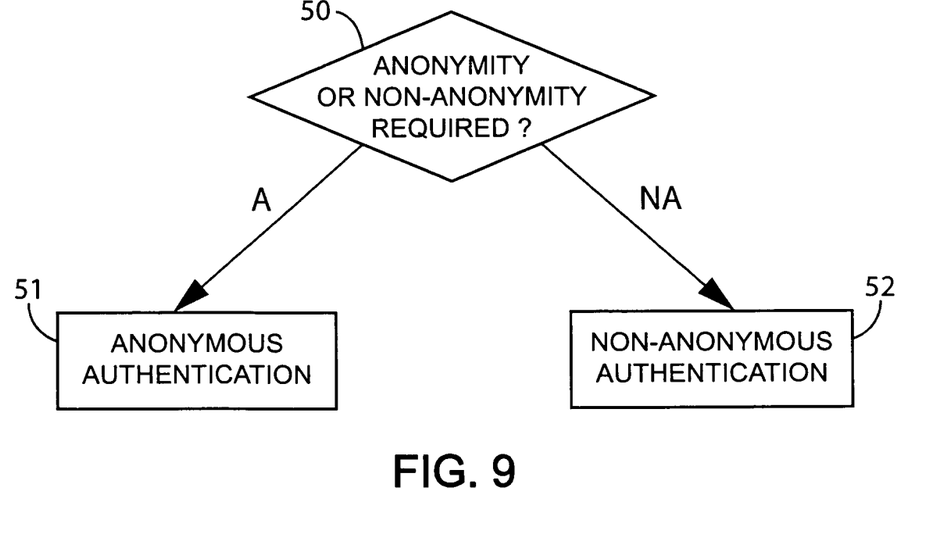
FIG. 9 is a flow chart showing steps of an authentication method according to a second aspect of the invention.

FIG. 9 summarizes the second aspect of the invention relating to anonymity. In step 50, it is determined between both parties A and B which one of anonymity or non-anonymity is required when authenticating A with B. If, after negotiation 37, it is determined that anonymity is required, the anonymous authentication mode 33 is selected and A is anonymously authenticated with B with the aid of an anonymity manager and according to the principles described above (step 51). If, by contrast, it is determined that non-anonymity is required, the non-anonymous authentication mode 34 is selected and A is classically authenticated with B without protection of his identity (step 52). Here again, the requirements of each party could take account of the access or service to be carried out after authentication.

According to a third aspect of the invention, which combines the first and second aspects described above, A supports authentication modes having respective degrees of protection of A's privacy both in terms of opposability and anonymity. For example, A could support at least some of the following combined authentication modes: non-anonymous and opposable, non-anonymous and non-opposable, anonymous and opposable and anonymous and non-opposable.

Figure 10:
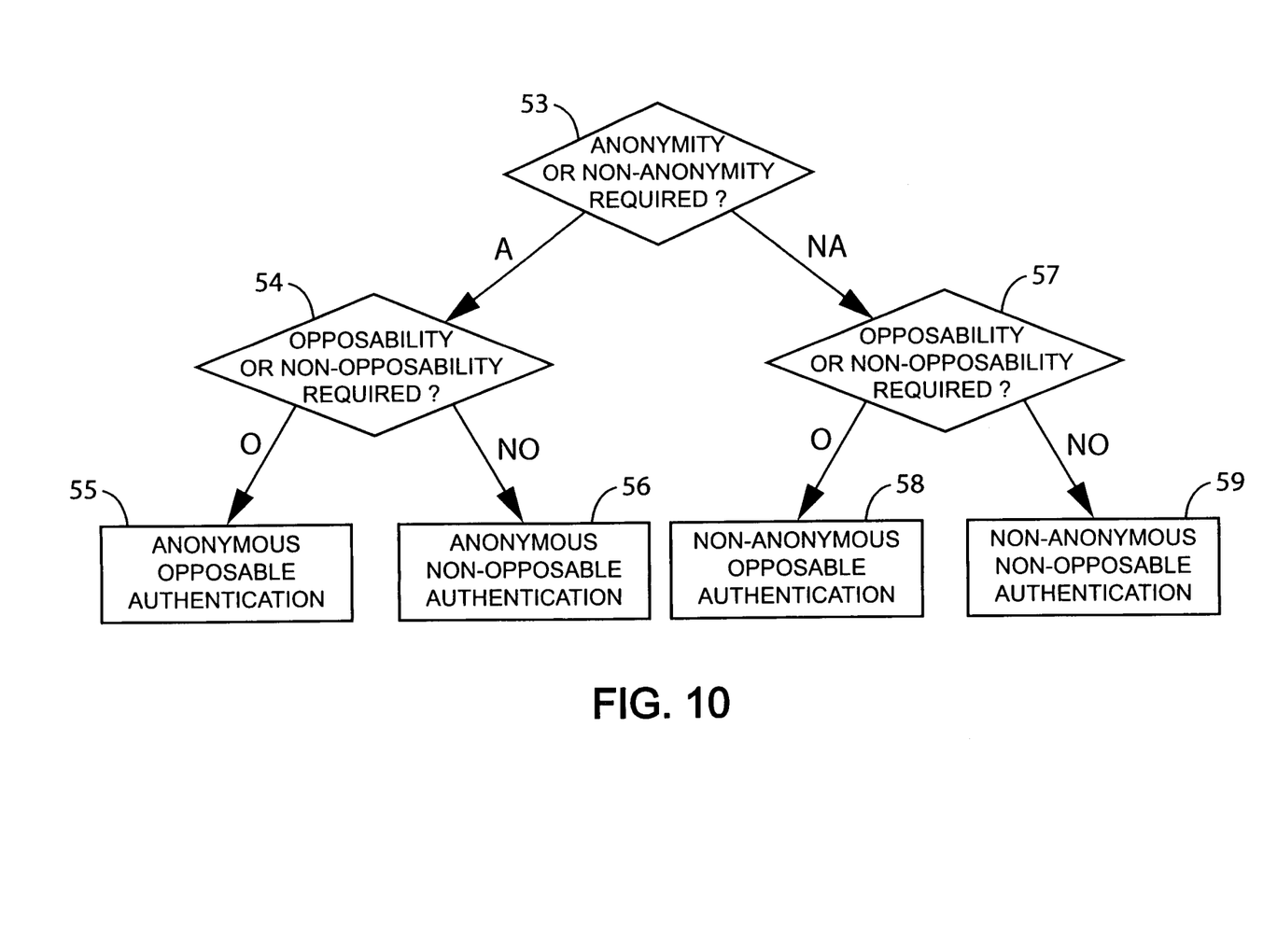
FIG. 10 is a flow chart showing steps of an authentication method according to a third aspect of the invention.

The principles described above apply to this embodiment. In particular, a negotiation between both parties A and B determines the degree of protection of A's privacy required for the authentication. This is illustrated in FIG. 10 in a case where A supports the four above-identified combined authentication modes. In this case, each negotiation between A and B aims at determining if anonymity or non-anonymity is required (step 53) and if opposability or non-opposability is required (steps 54 and 57).

As shown in FIG. 10, if anonymity and opposability are required, an anonymous and opposable authentication of A with B will be achieved (step 55). If anonymity and non-opposability are required, an anonymous and non-opposable authentication of A with B will be achieved (step 56). If non-anonymity and opposability are required, a non-anonymous and opposable authentication of A with B will be achieved (step 58). If non-anonymity and non-opposability are required, a non-anonymous and non-opposable authentication of A with B will be achieved (step 59).

As an example, a non-anonymous and opposable authentication can be carried out by virtue of any authentication mechanism using A's secret information, such as the symmetric mechanism of FIG. 1 using A's secret information as a private key. This kind of authentication is appropriate in cases where a full knowledge of actions made by A is required. For instance, a bank B should be in a position, after an authentication, to know who made a money transaction and to prove it if necessary.

As another example, an anonymous and non-opposable authentication can be carried out for instance by virtue of an authentication mechanism of the zero knowledge type applied to a new secret information s and a related pseudo identity PId allocated to A by an anonymity manager, as described above. In such configuration, even the anonymity manager cannot later prove that A has been authenticated with B. This kind of authentication is appropriate in cases where A's privacy must be fully protected, e.g. for some medical applications.

As explained above, after an authentication, B can give an access to A (e.g. a physical access to a place) or carry out a service with A (e.g. a commercial transaction, a communication service, an information exchange, etc.).

In an advantageous embodiment of the invention, an anonymous payment to B is performed by A. The anonymous payment can be carried out in a classical way, e.g. by using a method as disclosed in U.S. Pat. No. 4,759,063.

Such anonymous payment can be the result from the fact that the degree of protection of A's privacy does not correspond to any authentication mode supported by A. In other terms, the negotiation between A and B has failed. Since, A could not authenticate himself with B, he is required to pay immediately in an anonymous way. Alternatively, an immediate anonymous payment can follow an anonymous and/or a non-opposable authentication. By contrast, when A is authenticated with B according to a non-anonymous and/or an opposable authentication mode, a non-anonymous payment may be made later by A.

Of course, many other applications could be envisaged from the general principles described above.

A computer program can comprise instructions for at least partly implementing the method described above, when loaded and executed on computer means related to A and/or B.

I claim:

1. A method for authenticating a first device to a device, the method comprising:
the first device negotiating with the second device for use of a particular one authentication mode of a plurality of authentication modes, each authentication mode corresponding to a respective degree of privacy of the first device, wherein each respective degree of privacy corresponds to a particular degree of protection of the identity of the first device during authentication;
wherein in response to a successful negotiation for the one authentication mode, the second device authenticating the first device using particular one authentication mode;
wherein in response to an unsuccessful negotiation for the particular one authentication mode, the second device authenticating the first device using another authentication mode of the plurality of authentication modes, wherein the another authentication mode provides a different degree of privacy; and
wherein the plurality of authentication modes comprise at least an opposable authentication mode and a non-opposable authentication mode, which implements a zero knowledge type authentication mechanism.

2. The method as claimed in claim 1, wherein the opposable authentication mode implements an authentication mechanism of a private key type in which the secret information of the first device is a private key shared by the first device and the second device.

3. The method as claimed in claim 1, wherein the opposable authentication mode implements an authentication mechanism of a public key type.

4. The method as claimed in claim 1, wherein the plurality of authentication comprise at least an anonymous authentication mode and a non-anonymous authentication mode.

5. The method as claimed in claim 4, wherein the anonymous authentication mode comprises a secured allocation to the first device of new secret information by an anonymity manager, and is arranged for authenticating the first device to the second party using said new secret information.

6. The method as claimed in claim 5, wherein said new secret information is allocated to the first device by the anonymity manager for a limited time period.

7. The method as claimed in claim 5, wherein said new secret information is allocated by the anonymity manager so that it is common to a group of devices to which the first device belongs.

8. The method as claimed in claim 5, wherein a pseudo identity is allocated to the first device by the anonymity manager in correspondence with said new secret information.

9. The method as claimed in claim 8, wherein the anonymous authentication mode comprises a preliminary transmission of the pseudo identity from the first device to the second device and the verification by the second device with the anonymity manager that said pseudo identity is valid.

10. The method as claimed in claim 8, wherein the anonymous authentication mode is arranged for authenticating the first device with another device using said pseudo identity.

11. The method as claimed in claim 1, wherein the negotiation is based upon an access or service to be carried out between the first device and the second device.

12. The method as claimed in claim 1, further comprising an anonymous payment from a first party associated with the first device to a second party associated with the second device in response to the first device being authenticated to the second device according to an authentication mode corresponding to an anonymous authentication mode or when the negotiation for the particular one authentication mode has failed.

13. The method as claimed in claim 1, wherein the first device and/or the second device are related to at least one among: a terminal, a sensor, a server and an access point of a communication system.

14. The method as claimed in claim 1, wherein the the first device and second device are configured to communicate wirelessly.

15. A device comprising:
a processor configured to negotiate with a second device including a second processor for use of one authentication mode of a plurality of authentication modes, each authentication mode corresponding to a respective degree of privacy of the device, wherein each respective degree of privacy corresponds to a particular degree of protection of the identity of second device during authentication; and
wherein in response to a successful negotiation for the one authentication mode, the second device is authenticated by the processor according to the one authentication mode;
wherein in response to an unsuccessful negotiation for the one authentication mode, the second device is authenticated by the processor according to another authentication mode of the plurality of authentication modes, wherein the another authentication mode provides a different degree of privacy for the second device; and wherein the plurality of authentication modes comprise at least an opposable authentication mode and a non-opposable authentication mode, which implements a zero knowledge type authentication mechanism.

16. The method as recited in claim 1, wherein the another authentication mode is proposed by the second device.

17. A system comprising:
a first device; and
a second device configured to communicate wirelessly with the first device:
wherein the first device is configured to negotiate with the second device for use of one authentication mode of a plurality of authentication modes, each authentication mode corresponding to a respective degree of privacy of the first device, wherein each respective degree of privacy corresponds to a particular degree of protection of the identity of the first device during authentication;
wherein in response to a successful negotiation for the one authentication mode, the second device is configured to authenticate the first device using the one authentication;
wherein in response to an unsuccessful negotiation for the one authentication mode, the second device is configured to authenticate the first device using another authentication mode of the plurality of authentication modes, wherein the another authentication mode provides a different degree of privacy; and
wherein the plurality of authentication modes comprise at least an opposable authentication mode and a non-opposable authentication mode, which implements a zero knowledge type authentication mechanism.

18. A non-transitory computer readable storage medium including instructions which, when executed by a processor of a first device, cause the processor to:
negotiate with a second device including a second processor for use of one authentication mode of a plurality of authentication modes, each authentication mode corresponding to a respective degree of privacy of the second device, wherein each respective degree of privacy corresponds to a particular degree of protection of the identity of the second device during authentication;
wherein in response to a successful negotiation for the one authentication mode, the processor is configured to authenticate the second device according to the one authentication mode;
wherein in response to an unsuccessful negotiation for the one authentication mode, the processor is configured to is authenticate the second device according to another authentication mode of the plurality of authentication modes, wherein the another authentication mode provides a different degree of privacy for the second device; and
wherein the plurality of authentication modes comprise at least an opposable authentication mode and a non-opposable authentication mode, which implements a zero knowledge type authentication mechanism.

19. A device comprising:
a processor configured to negotiate with a second device including a second processor for use of one authentication mode of a plurality of authentication modes, each authentication mode corresponding to a respective degree of privacy of the device, wherein each respective degree of privacy corresponds to a particular degree of protection of the identity of the first device during authentication;
wherein in response to a successful negotiation for the one authentication mode, the device is authenticated by the second processor according to the one authentication mode; and
wherein in response to an unsuccessful negotiation for the one authentication mode, the device is authenticated by the second processor according to another authentication mode of the plurality of authentication modes, wherein the another authentication mode provides a different degree of privacy for the device; and
wherein the plurality of authentication modes comprise at least an opposable authentication mode and a non-opposable authentication mode, which implements a zero knowledge type authentication mechanism.

* * * * *